United States Patent
Kim et al.

(10) Patent No.: US 9,622,261 B2
(45) Date of Patent: *Apr. 11, 2017

(54) METHOD FOR SELECTING PMI FOR NON-ADAPTIVE HARQ OPERATION IN A MIMO WIRELESS COMMUNICATION SYSTEM

(71) Applicant: LG ELECTRONICS INC., Seoul (KR)

(72) Inventors: Bonghoe Kim, Anyang-si (KR); Yujin Noh, Anyang-si (KR); Hakseong Kim, Anyang-si (KR); Daewon Lee, Anyang-si (KR); Joon Kui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,308

(22) Filed: Apr. 8, 2016

(65) Prior Publication Data

US 2016/0227576 A1    Aug. 4, 2016

Related U.S. Application Data (63) Continuation of application No. 14/750,952, filed on Jun. 25, 2015, now Pat. No. 9,344,223, which is a (Continued)

(30) Foreign Application Priority Data

Nov. 24, 2008 (KR) .................. 10-2008-0116735

(51) Int. Cl.
*H04W 72/14* (2009.01)
*H04W 72/04* (2009.01)
(Continued)

(52) U.S. Cl.
CPC .......... *H04W 72/14* (2013.01); *H04B 7/0404* (2013.01); *H04B 7/0452* (2013.01);
(Continued)

(58) Field of Classification Search
None
See application file for complete search history.

(56) References Cited

U.S. PATENT DOCUMENTS 7,978,635 B2  7/2011  Tsai et al.
8,064,394 B2  11/2011  Jongren et al.
(Continued)

FOREIGN PATENT DOCUMENTS

KR  10-2008-0076744  8/2008
KR  10-2008-0083556  9/2008

OTHER PUBLICATIONS

Korean Intellectual Property Office Application Serial No. 10-2008-0116735, Notice of Allowance dated May 19, 2015, 2 pages.

*Primary Examiner* — Yolanda L Wilson
(74) *Attorney, Agent, or Firm* — Lee Hong Degerman Kang & Waimey (57) ABSTRACT

A method for transmitting an uplink signal at a User Equipment (UE) in a wireless communication system includes receiving, from a Base Station (BS), an uplink scheduling grant for multi-antenna transmission; transmitting the uplink signal precoded using precoding information included in the received uplink scheduling grant to the BS; and retransmitting the uplink signal to the BS according to Acknowledgment/Negative Acknowledgment (ACK/NACK) corresponding to the transmitted uplink signal. The retransmitted uplink signal is precoded using precoding information included in a most recent uplink scheduling grant or a predetermined precoding matrix if an uplink scheduling grant for the retransmission is not received from the BS.

10 Claims, 5 Drawing Sheets

Related U.S. Application Data continuation of application No. 14/268,917, filed on May 2, 2014, now Pat. No. 9,100,066, which is a continuation of application No. 13/774,787, filed on Feb. 22, 2013, now Pat. No. 8,756,472, which is a continuation of application No. 13/470,192, filed on May 11, 2012, now Pat. No. 8,407,547, which is a continuation of application No. 12/624,253, filed on Nov. 23, 2009, now Pat. No. 8,201,043.

(51) Int. Cl.
*H04L 5/00* (2006.01)
*H04B 7/0452* (2017.01)
*H04B 7/0404* (2017.01)
*H04L 1/18* (2006.01)
*H04B 7/0456* (2017.01)

(52) U.S. Cl.
CPC ......... *H04B 7/0456* (2013.01); *H04L 1/1812* (2013.01); *H04L 5/0055* (2013.01); *H04W 72/0413* (2013.01)

(56) References Cited

U.S. PATENT DOCUMENTS

| 2007/0260956 | A1 | 11/2007 | Terry et al. |
| 2009/0110114 | A1 | 4/2009 | Onggosanusi et al. |
| 2009/0307558 | A1 | 12/2009 | Lee et al. |
| 2010/0195594 | A1 | 8/2010 | Seo et al. |
| 2011/0051680 | A1 | 3/2011 | Kwak et al. |
| 2011/0211510 | A1* | 9/2011 | Kim .................. H04L 1/16 370/311 |
| 2011/0305134 | A1 | 12/2011 | Chung et al. |

* cited by examiner

METHOD FOR SELECTING PMI FOR NON-ADAPTIVE HARQ OPERATION IN A MIMO WIRELESS COMMUNICATION SYSTEM

CROSS-REFERENCE TO RELATED APPLICATIONS

This application is a continuation of U.S. patent application Ser. No. 14/750,952, filed on Jun. 25, 2015, now U.S. Pat. No. 9,344,223, which is a continuation of U.S. patent application Ser. No. 14/268,917, filed on May 2, 2014, now U.S. Pat. No. 9,100,066, which is a continuation of U.S. patent application Ser. No. 13/774,787, filed on Feb. 22, 2013, now U.S. Pat. No. 8,756,472, which is a continuation of U.S. patent application Ser. No. 13/470,192, filed on May 11, 2012, now U.S. Pat. No. 8,407,547, which is a continuation of U.S. patent application Ser. No. 12/624,253, filed on Nov. 23, 2009, now U.S. Pat. No. 8,201,043, which claims the benefit of earlier filing date and right of priority to Korean Patent Application No. 10-2008-0116735, filed on Nov. 24, 2008, the contents of which are all hereby incorporated by reference herein in their entirety.

BACKGROUND OF THE INVENTION

Field of the Invention

The present invention relates to a method for transmitting an uplink signal in a multiple antenna scheme, and more particularly, to a method for acquiring precoding information efficiently and transmitting an uplink signal using the precoding information in a multiple antenna scheme.

Discussion of the Related Art

The present invention relates to a method for transmitting MIMO is short for Multiple Input Multiple Output. Beyond conventional schemes using a single Transmit (Tx) antenna and a single Receive (Rx) antenna, MIMO uses a plurality of Tx antennas and a plurality of Rx antennas to thereby increase the transmission and reception efficiency of data. With the use of multiple antennas at a transmitter or a receiver, MIMO seeks to increase capacity or improve performance in a wireless communication system. The term "MIMO" is interchangeable with "multiple antenna".

The MIMO technology does not depend on a single antenna path to receive an entire message. Rather, it completes the message by combining data fragments received through a plurality of antennas. Because MIMO may increase data rate within a certain area or extend system coverage at a given data rate, it is considered as a promising future-generation mobile communication technology that may find its use in a wide range including mobile terminals, relays, etc. With the growth of data communication, MIMO is attracting attention as a future-generation technology that may overcome a limit on transmission capacity that is almost reached due to the increased data communication.

Figure 1:
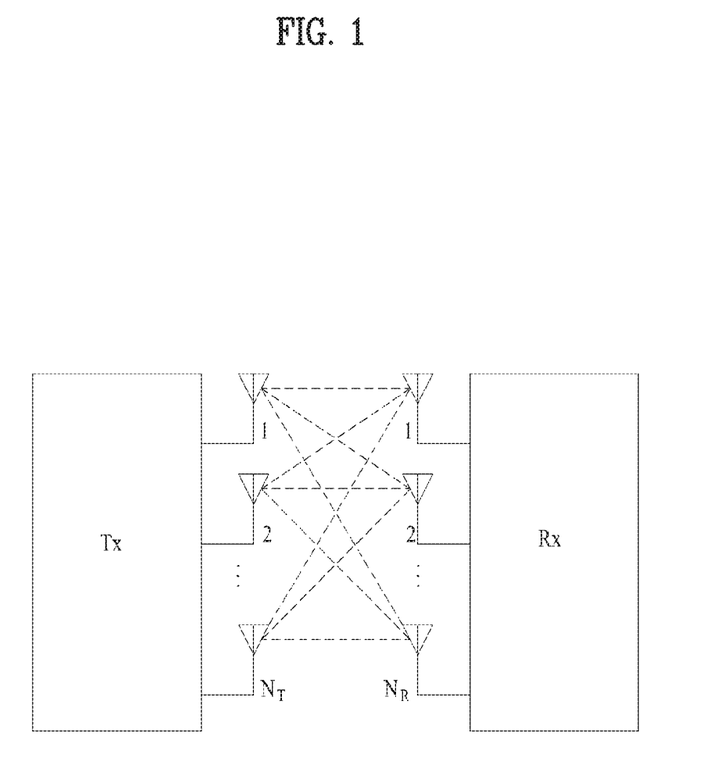
FIG. 1 illustrates the configuration of a typical Multiple Input Multiple Output (MIMO) communication system.

FIG. 1 illustrates the configuration of a typical MIMO communication system. Referring to FIG. 1, a simultaneous increase in Tx antennas of a transmitter to $N_T$ and in Rx antennas of a receiver to $N_R$ increases a theoretical transmission capacity in proportion to the number of antennas, compared to use of a plurality of antennas at only one of the transmitter and the receiver. Therefore, transmission rate is increased and frequency efficiency is remarkably increased. Given a maximum transmission rate $R_o$ that may be achieved in case of a single antenna, the increase of channel capacity may increase the transmission rate, in theory, to the product of $R_o$ and $R_i$ in case of multiple antennas. $R_i$ is a transmission rate increase rate.

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for $3^{rd}$. Generation (3G) mobile communications, future-generation Wireless Local Area Network (WLAN), etc.

Concerning the research trend of MIMO, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

There are two types of MIMO schemes: spatial diversity and spatial multiplexing. Spatial diversity increases transmission reliability using symbols that have passed in multiple channel paths, whereas spatial multiplexing increases transmission rate by transmitting a plurality of data symbols simultaneously through a plurality of Tx antennas. Taking advantages of these two schemes by using them in an appropriate combination is a recent active study area.

To describe a communication scheme in a MIMO system in detail, the following mathematical model may be used.

It is assumed that there are $N_T$ Tx antennas and $N_R$ Rx antennas as illustrated in FIG. 1. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 1]}$$

A different transmit power may be applied to each piece of transmission information $s_1, s_2, \ldots, s_{N_T}$. Let the transmit power levels of the transmission information be denoted by $P_1, P_2, \ldots, P_{N_T}$, respectively. Then the power-controlled transmission information may be given as [Equation 2].

$$\hat{s} = [\hat{s}_1, \hat{s}_2, \ldots \hat{s}_{N_T}]^T = [P_1 s_1, P_2 s_2, \ldots P_{N_T} s_{N_T}]^T \qquad \text{[Equation 2]}$$

$\hat{s}$ may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 3]}$$

Meanwhile, actual $N_T$ transmitted signals $x_1, x_2, \ldots x_{N_T}$ may be configured by applying a weight matrix W to the power-controlled information vector $\hat{s}$. The weight matrix W functions to appropriately distribute the transmission information to the Tx antennas according to transmission channel statuses, etc. These transmitted signals $x_1, x_2, \ldots x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 4]}$$

$w_{ij}$ denotes a weight for a $j^{th}$ piece of information $\hat{s}_j$ transmitted through an $i^{th}$ Tx antenna and the weights are expressed as the matrix W. W is referred to as a weight matrix or a precoding matrix.

The afore-mentioned transmitted signal x may be considered in two cases: spatial diversity and spatial multiplexing.

In spatial multiplexing, different signals are multiplexed prior to transmission. Accordingly, the elements of the information vector s have different values. In contrast, the same signal is transmitted in a plurality of channel paths in spatial diversity. As a result, the elements of the information vector s have the same value.

Spatial multiplexing and spatial diversity may be used in combination. For example, the same signal may be transmitted through three Tx antennas in spatial diversity, while different signals may be transmitted through the other Tx antennas in spatial multiplexing.

Given $N_R$ Rx antennas, signals received at the Rx antennas, $y_1, y_2, \ldots, y_{N_R}$ may be represented as the following vector.

$$y = [y_1, y_2, \ldots y_{N_R}]^T \quad \text{[Equation 5]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and a matrix by grouping them. The vector representation of channels may be carried out in the following manner.

Figure 2:
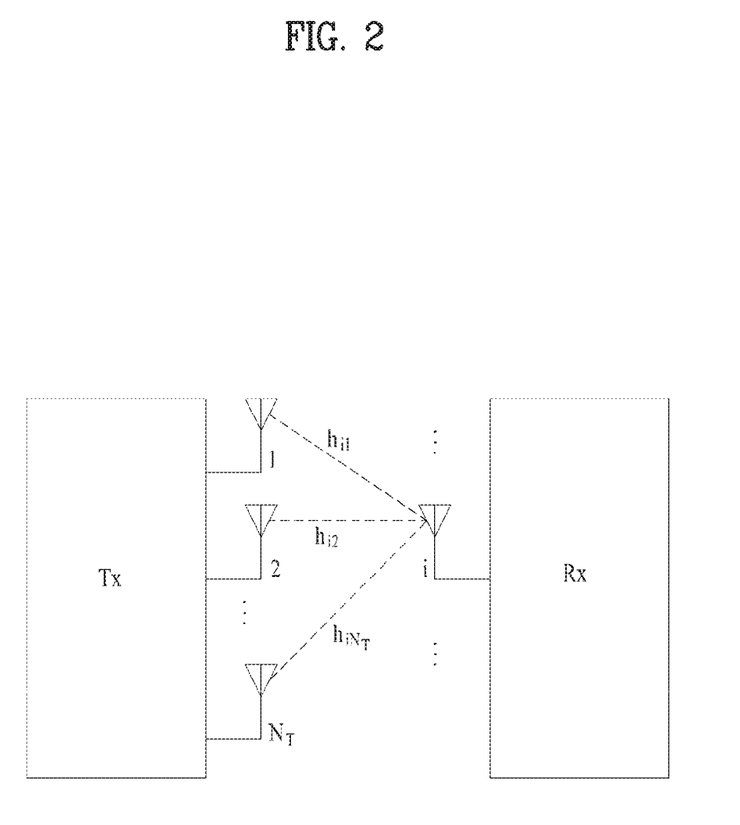
FIG. 2 illustrates channels from $N_T$ Transmission (Tx) antennas to an $i^{th}$ Reception (Rx) antenna.

FIG. 2 illustrates channels from $N_T$ Tx antennas to an $i^{th}$ Rx antenna.

Referring to FIG. 2, the channels from the $N_T$ Tx antennas to the $i^{th}$ Rx antenna may be expressed as [Equation 6].

$$h_i^T = [h_{i1}, h_{i2}, \ldots h_{iN_T}] \quad \text{[Equation 6]}$$

Also, all channels from $N_T$ Tx antennas to $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 7]}$$

Actual channels experience the above channel matrix H and then are added with

Additive White Gaussian Noise (AWGN). The AWGN $n_1$, $n_2, \ldots n_{N_R}$ added to the $N_R$ Rx antennas is given as the following vector.

$$n = [n_1, n_2, \ldots n_{N_R}]^T \quad \text{[Equation 8]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 9]}$$

$$Hx + n$$

In a 3GPP LTE system attracting attention as a future-generation mobile communication technology, the above-described MIMO operation applies only to downlink signal transmission from a Base Station (BS) to a User Equipment (UE). As efforts are continuous to increase transmission rate and achieve diversity gain also from uplink signal transmission, there exists a need for specifying this uplink MIMO technology in upcoming standards.

SUMMARY OF THE INVENTION

Accordingly, the present invention is directed to a method for selecting a Precoding Matrix Index (PMI) for a non-adaptive Hybrid Automatic Repeat reQuest (HARD) operation in a Multiple Input Multiple Output (MIMO) wireless communication system that substantially obviates one or more problems due to limitations and disadvantages of the related art.

An object of the present invention is to provide to provide a method for efficiently applying a MIMO scheme to uplink signal transmission.

Another object of the present invention is to provide a method for acquiring precoding information efficiently and transmitting an uplink signal using the precoding information in a MIMO scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting an uplink signal in a UE in a wireless communication system includes receiving from a BS a scheduling grant signal including precoding matrix information to be used for an uplink signal transmission from the UE, precoding an uplink signal using the precoding matrix information included in the received scheduling grant signal, transmitting the precoded uplink signal initially to the BS, and retransmitting the uplink signal at least one time, if the BS fails to receive the initially transmitted uplink signal. If a scheduling grant signal is not received for the retransmission from the BS, the uplink signal is precoded and retransmitted using precoding matrix information included in a latest scheduling grant signal received for transmission of an uplink signal having an HARQ process number equal to an HARQ process number of the uplink signal to be retransmitted.

If the scheduling grant signal is not received for the retransmission from the BS and there is not the latest received precoding matrix information for an uplink signal having the same HARQ process number of the uplink signal to be retransmitted, the uplink signal may be precoded and retransmitted using precoding matrix information included in a latest scheduling grant signal received for transmission of an uplink signal having the same rank and/or frequency band as a rank and/or frequency band of the uplink signal to be retransmitted. When a different precoding matrix is used according to a frequency band allocated to the UE, a precoding matrix for an uplink signal having the same rank and frequency band as the rank and frequency band of the uplink signal to be retransmitted may be used as a precoding matrix for the uplink signal to be retransmitted. If a precoding matrix applies to a total system band, only a rank may be considered.

If the scheduling grant signal is not received for the retransmission from the BS and there is not the latest received precoding matrix information for an uplink signal having the same rank and/or frequency band as the rank and/or frequency band of the uplink signal to be transmitted, the uplink signal may be precoded and retransmitted using the precoding matrix information included in the scheduling grant signal received for the initial transmission.

In another aspect of the present invention, a method for transmitting an uplink signal in a UE in a wireless communication system includes receiving from a BS a scheduling grant signal including precoding matrix information to be used for an uplink signal transmission from the UE, precoding an uplink signal using the precoding matrix information included in the received scheduling grant signal and transmitting the precoded uplink signal initially to the BS, and retransmitting the uplink signal at least one time, if the BS fails to receive the initially transmitted uplink signal. If a scheduling grant signal is not received for the retransmission from the BS, the uplink signal is precoded and retransmitted using a precoding matrix of a precoding matrix group preset between the UE and the BS in a sequential order, the precoding matrix group including one or more precoding matrices.

The wireless communication system may be a synchronous HARQ system and the UE may transmit the uplink signal using multiple antennas.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

A User Equipment (UE) needs to efficiently acquire precoding information to transmit an uplink signal in a Multiple Input Multiple output (MIMO) scheme. Sets of available precoding vectors or precoding matrices are preset in the form of a codebook between a transmitter and a receiver, and a Precoding Matrix Index (PMI) is transmitted as precoding information between the transmitter and the receiver. The precoding matrices of the codebook may be grouped into different subsets according to channel ranks. To help the understanding of such precoding matrix information, a codeword as a transmission unit, a rank, and a stream will first be described in brief.

In a typical communication system, the transmitter encodes transmission information using a Forward Error Correction (FEC) code prior to transmission so that the receiver may correct channel errors in the received information. The receiver recovers the transmitted information by demodulating the received signal and then FEC-decoding the demodulated signal. During the decoding, the receiver corrects the channel errors in the received signal.

Every error correction code has its maximum limit in channel error correction. If a received signal has errors beyond the limit of an error correction code, the receiver cannot decode the received signal to error-free information. Accordingly, the receiver needs a criterion by which it determines whether the decoded information has errors or not. Aside from the error correction, a special coding process is required for error detection. In general, a Cyclic Redundancy Check (CRC) is used as an error detection code.

CRC is one of coding methods for error detection, not for error correction. Typically, the transmitter encodes transmission information with a CRC and then encodes the CRC-coded information with an FER code. The resulting one coded unit is referred to as "codeword".

In the mean time, the numbers of rows and columns in a channel matrix H representing channel statuses are determined according to the numbers of Transmission (Tx) and Reception (Rx) antennas. The number of rows is identical to that of Rx antennas, $N_R$ and the number of columns is identical to that of Tx antennas, $N_T$. Thus, the channel matrix H is of size $N_R*N_T$.

In general, the rank of a matrix is defined as the minimum of the numbers of independent rows or columns. Accordingly, the rank of the matrix is not larger than the number of rows or columns. For example, the rank of the matrix H, rank(H) is limited as follows.

$$\text{rank}(H) \leq \min(N_T, N_R) \quad \text{[Equation 10]}$$

If the matrix is eigenvalue-decomposed, its rank may be defined as the number of non-zero eigenvalues. Similarly, in case of Singular Value Decomposition (SVD), the rank may be defined as the number of non-zero singular values. Therefore, the rank of a channel matrix physically means the maximum number of different pieces of information that can be transmitted on given channels.

A different piece of information transmitted in MIMO is referred to as 'transmission stream' or shortly 'stream'. The 'stream' may be called 'layer'. It is thus concluded that the number of transmission streams is not larger than the rank of channels, i.e. the maximum number of different pieces of transmittable information.

The channel matrix H is determined by $$\text{\# of streams} \leq \text{rank}(H) \leq \min(N_T, N_R) \quad \text{[Equation 11]}$$

# of streams denotes the number of streams. One thing to be noted herein is that one stream may be transmitted through one or more antennas.

As stated before, it is assumed that available precoding matrices are preset in the form of a codebook between the transmitter and the receiver. It is also assumed that available subsets of precoding matrices are predetermined according to channel ranks.

If a subset of precoding matrices with of a specific rank in the codebook includes a subset of precoding matrices with a rank lower than the specific rank, it is said that the codebook satisfies a nested property. Therefore, precoding matrix information for a specific rank may be derived from a subset of precoding matrices with a higher or lower rank.

Exemplary embodiments of the present invention are based on the assumption that a UE transmits an uplink signal in MIMO in an HARQ system.

HARQ is a hybrid technology of channel coding and Automatic Repeat reQuest (ARQ) in combination to improve decoding performance by retransmitting an erroneous data block and combining the initial transmission data block with the retransmission data block. HARQ schemes may be categorized according to the regularity of retransmission timings: asynchronous HARQ and synchronous HARQ. The asynchronous HARQ is characterized by a variable retransmission timing, whereas the synchronous HARQ by a preset retransmission timing. Meanwhile, the HARQ schemes are classified into Chase Combining (CC) and Incremental Redundancy (IR) depending on the types of Redundancy Versions (RVs) used for retransmission. In CC, a retransmission data block is identical to a previously transmitted data block, thus resulting in a Signal-to-Noise Ratio (SNR) gain. In contrast, IR achieves a coding gain by retransmitting a data block including data of a different RV from a previous transmission data block.

The following description is made with the appreciation that an HARQ process unit is referred to as an "HARQ process block", or simply an "HARQ process" unless it causes obscurity. An Identifier (ID) that identifies an HARQ process is referred to as an HARQ process number.

Now a detailed description will be made of a method for applying MIMO to uplink signal transmission of a UE according to an exemplary embodiment of the present invention.

In accordance with the exemplary embodiment of the present invention, it is assumed that the UE acquires precoding information from a scheduling grant signal received from a Node B, for use in uplink signal transmission. In other words, the Node B transmits PMI information and MIMO signal transmission information by a scheduling grant signal to the UE, for use in uplink signal transmission.

In an asynchronous HARQ system characterized by a variable retransmission timing, the UE needs to receive a scheduling grant signal from the Node B, for every uplink signal transmission. In this case, the UE may acquire precoding matrix information from the scheduling grant signal and precodes an uplink signal based on the precoding matrix information, prior to transmission to the Node B in accordance with the exemplary embodiment of the present invention.

Meanwhile, a synchronous HARQ system that presets a retransmission timing does not require the UE to receive a scheduling grant signal from the Node B, for each uplink retransmission. Accordingly, there exists a need for a method for efficiently acquiring precoding matrix information that will apply to a particular retransmission HARQ process block, taking into account the feature of the synchronous HARQ system in the UE, which will be described below in detail.

Further, when the system employs semi-persistent scheduling (SPS), such as the system providing services for VoIP (Voice over Internet Protocol), the BS sets transmission parameters such as RB allocation and MCS semi-statically. In SPS operation, a BS does not transmit scheduling grant signal for initial uplink transmission and may transmit scheduling grant for a retransmission if necessary. Accordingly, there exists a need for a method for efficiently acquiring precoding matrix information that will apply to a particular retransmission HARQ process block, taking into account the feature of the SPS system in the UE, which also will be described below in detail.

Figure 3A:
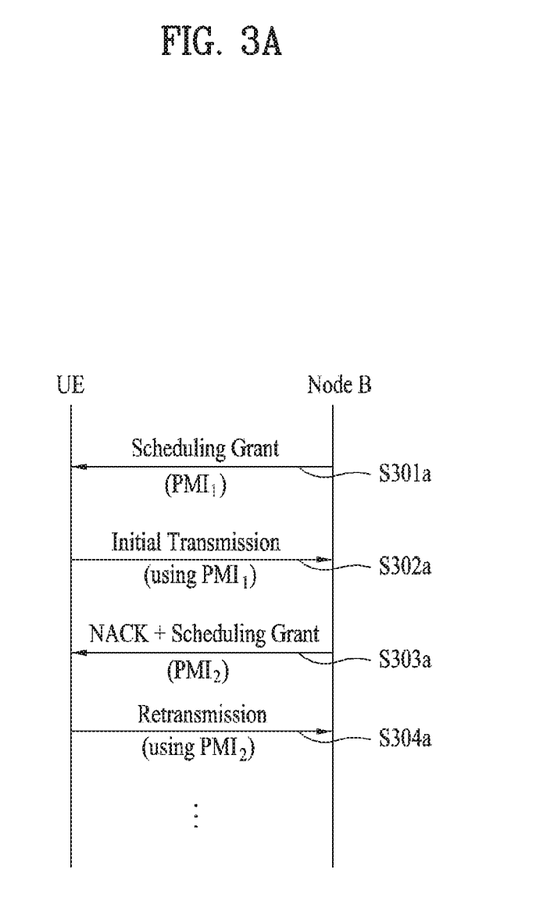
FIGS. 3A and 3B illustrate methods for transmitting an uplink signal in a MIMO scheme in a User Equipment (UE) according to exemplary embodiments of the present invention.
Figure 3B:
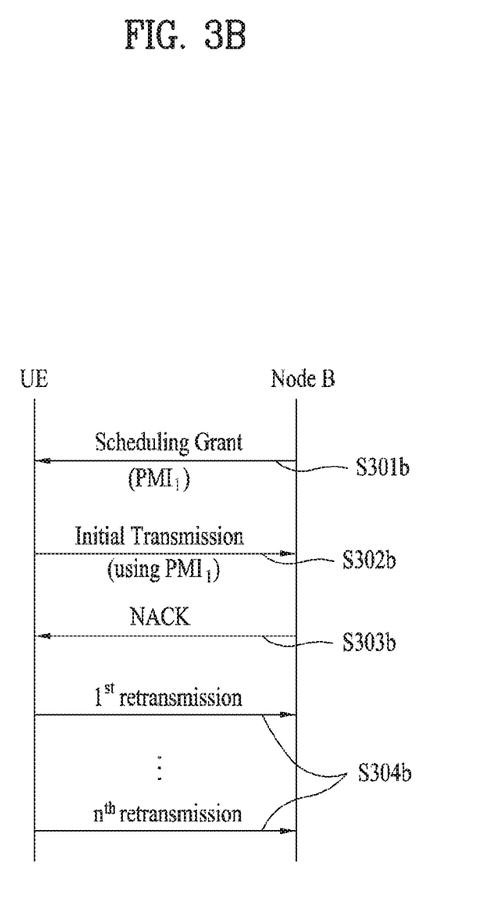

FIGS. 3A and 3B illustrate methods for transmitting an uplink signal in a MIMO scheme in a UE according to exemplary embodiments of the present invention.

FIG. 3A illustrates a case of receiving a scheduling grant signal from a Node B, for every uplink transmission in a UE, as in the asynchronous HARQ system, and FIG. 3B illustrates a case of not receiving a scheduling grant signal from a Node B, for an uplink retransmission in a UE, as in the synchronous HARQ system.

Referring to FIG. 3A, the UE may receive a scheduling grant signal from the Node B, for an uplink signal transmission, in step S301a. The received scheduling grant signal may include precoding matrix information (e.g. $PMI_1$) for an upcoming uplink signal transmission of the UE. In step S302a, the UE may transmit an uplink signal to the Node B using an acquired precoding matrix (e.g. $PMI_1$).

If the Node B fails to receive the uplink signal in step S302a, it may transmit a Negative ACKnowledgment (NACK) to the UE in step S303a. At the same time, the Node B may transmit a scheduling grant signal including precoding matrix information (e.g. $PMI_2$) to the UE, for a retransmission of the HARQ process in step S303a. Upon receipt of the scheduling grant signal, the UE may retransmit the HARQ process using a precoding matrix (e.g. $PMI_2$) indicated by the scheduling grant signal in step S304a.

The system operating in the manner described in FIG. 3A may be an asynchronous HARQ system. Notably, when a synchronous HARQ system is configured so as to transmit a scheduling grant signal from the Node B to the UE for every uplink retransmission, it may operate in the manner described in FIG. 3A in an exemplary embodiment of the present invention.

However, when the Node B does not transmit a scheduling grant signal to the UE for every uplink retransmission in the synchronous HARQ system, the following problem may occur.

Referring to FIG. 3B, the UE receives a scheduling grant signal for an initial uplink signal transmission from the Node B in step S301b. The scheduling grant signal includes precoding matrix information (e.g. $PMI_1$) for use in the initial uplink signal transmission. As in the asynchronous HARQ system, the UE always receives a scheduling grant signal from the Node B, for an initial uplink transmission in the synchronous HARQ system. Subsequently, the UE may transmit an uplink signal using a precoding matrix (e.g. $PMI_1$) indicated by the scheduling grant signal in step S302b.

If the Node B fails to receive the uplink signal in step S302b, it may transmit a NACK to the UE in step S303b. The Node B may not transmit a scheduling grant signal to the UE, for retransmission of the HARQ process. Then the UE needs a method for determining precoding matrix information for use in one or more subsequent retransmissions in step S304b.

According to another embodiment of the present invention for the system employing SPS, the Node B does not transmit scheduling grant signal to the UE for initial transmission and may transmit scheduling grant signal to the UE for retransmission signal if necessary. Thus, the UE needs a method for determining precoding matrix information for use in one or more retransmissions, similar to FIG. 3B.

Figure 4:
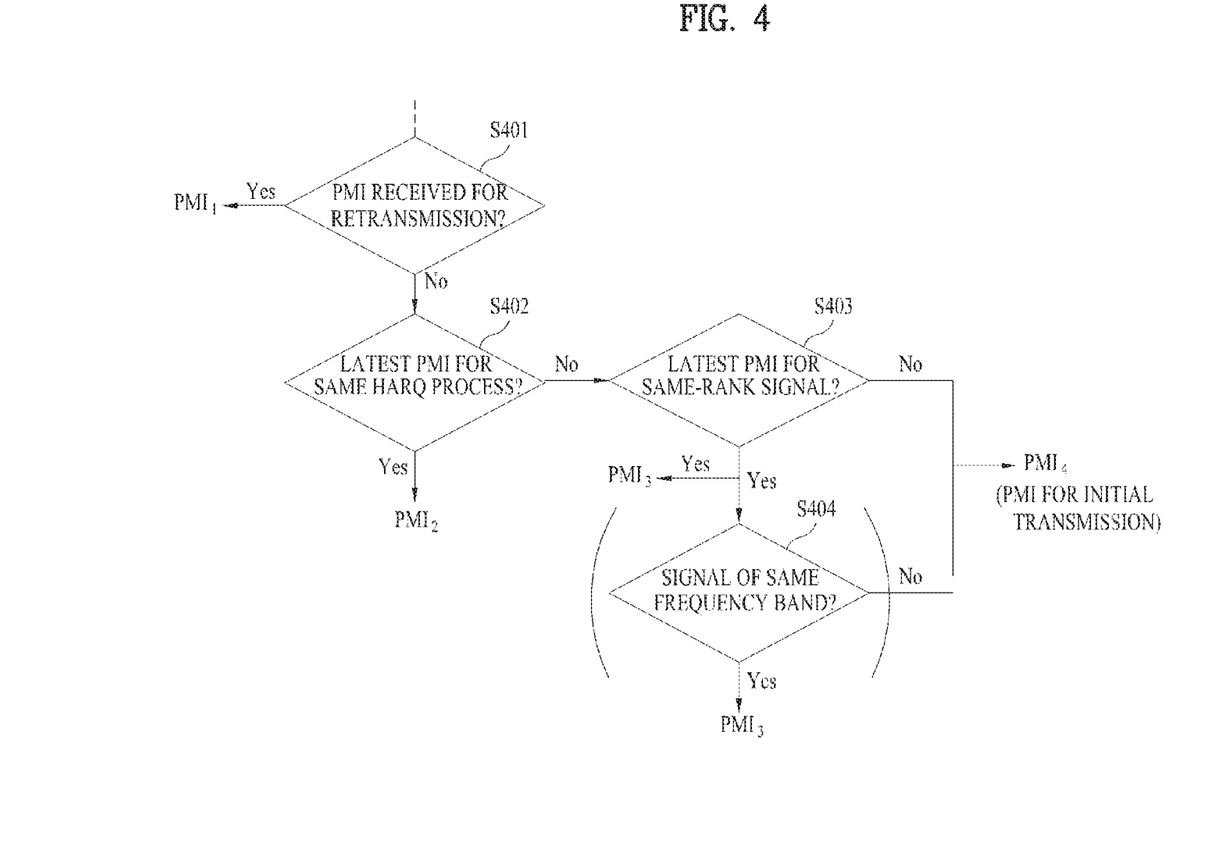
FIG. 4 is a flowchart illustrating a method for acquiring precoding matrix information for a retransmission in a UE, when the UE fails to receive a scheduling grant signal from a Node B according to an exemplary embodiment of the present invention.

FIG. 4 is a flowchart illustrating a method for acquiring precoding matrix information in a UE, when the UE fails to receive a scheduling grant signal from a Node B according to an exemplary embodiment of the present invention.

Referring to FIG. 4, the UE determines whether a scheduling grant signal has been received and a retransmission PMI has been acquired from the scheduling grant signal, for an uplink retransmission in step S401. If the Node B transmits a PMI (e.g. $PMI_1$) by a scheduling grant signal for every uplink retransmission even in the synchronous HARQ system as in the foregoing exemplary embodiment of the present invention, the UE may retransmit data using $PMI_1$ successfully.

However, if the UE does not receive PMI information for the retransmission from the Node B, it determines whether there is a latest scheduling grant signal including a PMI (e.g. $PMI_2$) for an HARQ process with the same number as a current HARQ process to be retransmitted in step S402. In general, a retransmission using a latest received PMI for the same HARQ process may be carried out successfully in MIMO without much performance degradation.

However, it may occur that there is not a latest received PMI for the same HARQ process. That is, the UE may initiate a new transmission in a different HARQ process during the time period between the initial transmission and the retransmission. Then the UE needs to consider the followings to select a PMI for the retransmission. The PMI selection may vary depending on an algorithm that the Node B uses to calculate a PMI in transmission of a scheduling grant signal.

First of all, it is assumed that the Node B calculates the same PMI for a total system band (Wide band PMI). In this case, the PMI may not be changed according to the size or position of resources allocated by a Node B scheduler. Thus, the retransmission may be carried out without performance degradation by use of a PMI set in a latest scheduling grant signal indicating a rank identical to the rank of a current retransmission signal.

Specifically, the UE may determine whether there is a PMI indicated by a latest scheduling grant signal received for a signal of the same rank as a current HARQ process to be retransmitted in step S403. If the PMI exists and it equally applies to the total system band, the UE may perform the retransmission using the PMI (e.g. $PMI_3$).

Meanwhile, the Node B may calculate the same PMI only for a frequency band to be used for the receiver, not for the system band. The PMI is not viable if the size or position of resources indicated by a current scheduling grant signal is changed from that indicated by a previous scheduling grant signal. Even though the size or position of resources is not changed, the same PMI is not available when a rank is different. Thus the UE may use a PMI indicated by a latest scheduling grant signal that allocates the same size or position of resources and/or the same rank.

Therefore, if a latest received PMI exists for the same-rank signal but the PMI does not apply uniformly to the total system band in step S403, the UE additionally determines whether the PMI is for a signal identical to the uplink signal to be retransmitted in the size and position of resources (e.g. frequency band) in step S404. If the PMI is for a signal having resources of the same size and position, the UE may perform the retransmission using the PMI (e.g. $PMI_3$). On the other hand, in the absence of the PMI, the UE may perform the retransmission using a PMI (e.g. $PMI_4$) indicated by a scheduling grant signal received for an initial uplink transmission in the exemplary embodiment of the present invention.

For the most part, a MIMO system performs best when a channel does not change rapidly. If the UE does not receive a scheduling grant signal for a retransmission, it uses the same frequency resources as used for an initial uplink transmission in the exemplary embodiment of the present invention. Therefore, unless a channel changes fast, the use of the PMI used in the initial transmission for a retransmission does not affect performance much.

Meanwhile, if there is no latest received PMI for an HARQ process of the same rank in step S403, the UE uses the PMI (e.g. $PMI_4$) indicated by the scheduling grant signal received for the initial uplink transmission, as illustrated in FIG. 4. Notably, if a precoding codebook satisfies the nested property, the UE may also use a precoding matrix of the same index under a higher or lower rank. The nested property means that a precoding matrix of a specific rank includes a precoding matrix of a lower rank. When the codebook satisfies the nested property, the UE may use a PMI indicated by a latest scheduling grant signal despite a different rank.

It may be further contemplated as another exemplary embodiment of the present invention that when a UE does not receive a scheduling grant signal for a retransmission, it uses a PMI preset between the transmitter and the receiver. The PMI may be preset in many ways.

For example, a predetermined precoding matrix may be selected from a set of precoding matrices of an intended rank. One or more precoding matrices may be selected. In case of selecting a plurality of precoding matrices, the UE uses the PMIs indicating the precoding matrices cyclically in a predetermined order. For instance, the order may be defined as a function of fixed timing such as system timing.

On the other hand, another embodiment of the present invention, regarding the system using SPS, permits the UE to use the PMI information received via RRC (Radio Resource Configuration) signaling. Node B in the system using SPS does not transmit scheduling grant signal to the UE even for the initial transmission. In this case, the UE cannot acquire the latest PMI information or the like. Thus, the UE according to the present embodiment use PMI information received via RRC signaling, and transmit uplink signal (e.g. VoIP packet) using this information. Additionally, in SPS operation, if UE receives a scheduling grant in a retransmission, UE retransmits using the parameters in the scheduling grant. After receiving a scheduling grant, the method to determine PMI for the subsequent retransmission is the same as the previously explained method.

As is apparent from the above description, when a UE transmits an uplink signal in MIMO, the UE can efficiently acquire precoding information and transmit the uplink signal based on the precoding information.

The foregoing exemplary embodiments of the present invention are applicable to a variety of future-generation wireless communication systems using MIMO for uplink signal transmission.

It will be apparent to those skilled in the art that various modifications and variations can be made in the present invention without departing from the spirit or scope of the inventions.

What is claimed:

1. A method for transmitting an uplink signal at a User Equipment (UE) in a wireless communication system, the method comprising:
   determining a precoding matrix based on whether an uplink scheduling grant for retransmission is detected or not;
   precoding the uplink signal using the determined precoding matrix; and
   retransmitting the precoded uplink signal to a Base Station (BS).

2. The method according to claim 1, wherein if the scheduling grant for the retransmission is not detected, the precoding matrix is determined according to precoding information included in a most recent uplink scheduling grant,
   when a number of transmission layers for retransmitting is equal to a number of transmission layers indicated by the most recent uplink scheduling grant.

3. The method according to claim 2, wherein the precoding information indicates a number of transmission layers and a Precoding Matrix Index (PMI).

4. The method according to claim 1, wherein if the scheduling grant for the retransmission is not detected, the precoding matrix is determined to a predetermined precoding matrix corresponding to a number of transmission layers for retransmitting,
   when the number of transmission layers for retransmitting is not equal to a number of transmission layers indicated by a most recent uplink scheduling grant.

5. The method according to claim 1, wherein if the scheduling grant for the retransmission is detected,
   the precoding matrix is determined according to precoding information included in the detected uplink scheduling grant.

6. A User Equipment (UE) in a wireless communication system, the UE adapted to:
   determine a precoding matrix based on whether an uplink scheduling grant for retransmission is detected or not;
   precode an uplink signal using the determined precoding matrix; and
   retransmit the precoded uplink signal to a Base Station (BS).

7. The UE according to claim 6, wherein if the scheduling grant for the retransmission is not detected, the precoding matrix is determined according to precoding information included in a most recent uplink scheduling grant,
   when a number of transmission layers for retransmitting is equal to a number of transmission layers indicated by the most recent uplink scheduling grant.

8. The UE according to claim 7, wherein the precoding information indicates a number of transmission layers and a Precoding Matrix Index (PMI).

9. The UE according to claim 6, wherein if the scheduling grant for the retransmission is not detected,
   the precoding matrix is determined to a predetermined precoding matrix corresponding to a number of transmission layers for retransmitting,
   when the number of transmission layers for retransmitting is not equal to a number of transmission layers indicated by a most recent uplink scheduling grant.

10. The UE according to claim 6, wherein if the scheduling grant for the retransmission is detected,
    the precoding matrix is determined according to precoding information included in the detected uplink scheduling grant.

* * * * *